US012289753B2

(12) United States Patent
Lin et al.

(10) Patent No.: US 12,289,753 B2
(45) Date of Patent: Apr. 29, 2025

(54) DELAY-AWARE BANDWIDTH SCHEDULING FOR WIRELESS COMMUNICATION NETWORK

(71) Applicant: MEDIATEK INC., Hsinchu (TW)

(72) Inventors: Ying-You Lin, Hsinchu (TW); Yi-Lon Chin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 323 days.

(21) Appl. No.: 17/533,254

(22) Filed: Nov. 23, 2021

(65) Prior Publication Data
US 2022/0167373 A1    May 26, 2022

Related U.S. Application Data

(60) Provisional application No. 63/118,037, filed on Nov. 25, 2020.

(51) Int. Cl.
*H04W 72/566* (2023.01)
*H04W 72/543* (2023.01)

(52) U.S. Cl.
CPC ....... *H04W 72/569* (2023.01); *H04W 72/543* (2023.01)

(58) Field of Classification Search
CPC . H04W 72/569; H04W 72/543; H04W 28/02; H04W 72/542; H04L 47/2433; H04L 67/1008; H04L 61/251; H04L 61/4511; H04L 69/167; H04L 69/22; H04L 67/1029; H04L 49/901; G06F 9/4881;
(Continued)

(56) References Cited

U.S. PATENT DOCUMENTS 9,226,305 B2 * 12/2015 Ghosh ................. H04W 72/56
11,576,218 B2 * 2/2023 Xu ........................ H04W 72/23
(Continued)

FOREIGN PATENT DOCUMENTS

CN        111314956 A      6/2020

OTHER PUBLICATIONS

Chinese language office action dated May 9, 2022, issued in application No. TW 110143655.
(Continued)

*Primary Examiner* — David Q Nguyen
(74) *Attorney, Agent, or Firm* — McClure, Qualey & Rodack, LLP

(57) ABSTRACT

A device is provided. The device includes: at least one antenna, a plurality of buffer sets, and a circuit. Each buffer set includes a plurality of queue buffers, and each queue buffer is dedicated for a respective application category. The circuit communicates with one or more stations through the at least one antenna. In response to the circuit determining that a plurality of incoming frames or packets are classified into the same application category, the circuit performs an intra-Access Category (intra-AC) scheduling mechanism to determine priorities of data stored in the queue buffers in the same application category according to QoS (quality-of-service) requirements of each station so as to arrange for an MU (multi-user) PPDU (physical-layer protocol data unit) to be transmitted to at least a portion of the stations.

20 Claims, 12 Drawing Sheets

(58) Field of Classification Search
CPC ...... G06F 13/1673; G06F 13/385; G06F 5/14; G06F 13/128; G06F 2205/064; Y02D 10/00
USPC .............................. 370/328, 329, 330, 331
See application file for complete search history.

(56) References Cited

U.S. PATENT DOCUMENTS

| | | | |
|---|---|---|---|
| 2007/0174608 A1* | 7/2007 | Balandin | H04L 63/105 713/155 |
| 2013/0336234 A1* | 12/2013 | Ghosh | H04W 72/52 370/329 |
| 2014/0314060 A1* | 10/2014 | Park | H04L 47/28 370/338 |
| 2015/0370535 A1* | 12/2015 | Ralston | H04L 49/901 710/310 |
| 2016/0234831 A1* | 8/2016 | Tian | H04W 72/121 |
| 2021/0176302 A1* | 6/2021 | Bharti | H04L 67/1008 |
| 2021/0181981 A1* | 6/2021 | Zhu | G06F 3/0679 |

OTHER PUBLICATIONS

Derham, T., et al.; "CR 2693 Mirrored SCS;" IEEE 802.11-19/0420r1; Mar. 2019; pp. 1-11.

* cited by examiner

| Element ID | Length (55) | TS Info | Nominal MSDU Size | Maximum MSDU Size | Minimum Service Interval | Maximum Service Interval | Inactivity Interval | Suspension Interval |
|---|---|---|---|---|---|---|---|---|
| 1 | 1 | 3 | 2 | 2 | 4 | 4 | 4 | 4 |

Octets:

| Service Start Time | Minimum Data Rate | Mean Data Rate | Peak Data Rate | Burst Size | Delay Bound | Minimum PHY Rate | Surplus Bandwidth Allowance | Medium Time |
|---|---|---|---|---|---|---|---|---|
| 4 | 4 | 4 | 4 | 4 | 4 | 4 | 2 | 2 |

Octets:

502 — Service Start Time
504 — Minimum Data Rate
506 — Mean Data Rate
508 — Peak Data Rate
510 — Burst Size
512 — Delay Bound
514 — Minimum PHY Rate
516 — Surplus Bandwidth Allowance
518 — Medium Time

FIG. 5

DELAY-AWARE BANDWIDTH SCHEDULING FOR WIRELESS COMMUNICATION NETWORK

CROSS REFERENCE TO RELATED APPLICATIONS

This application claims the benefits of U.S. Provisional Application No. 63/118,037 filed on Nov. 25, 2020, the entirety of which is incorporated by reference herein.

BACKGROUND OF THE INVENTION

Field of the Invention

The present invention relates to traffic scheduling, and, in particular, to a device and a method for delay-aware bandwidth scheduling (DABS) in wireless communication.

Description of the Related Art

Wireless communications systems that involve the use of transmitters and receivers having one or multiple antennas are known as multiple-input multiple-output (MIMO) systems. They offer increased peak data rates, spectral efficiency, and quality of service through the use of a plurality of parallel data streams.

With the advancements being made in this technology, a station (e.g., a computing device) can execute various types of applications, such as VoIP applications, video-conferencing applications, gaming applications, email applications, FTP applications, chat applications, peer-to-peer (P2P) applications, and web applications. However, these applications may have different requirements for delay time and buffer size. When multiple stations are connected to an access point, scheduling the packets and frames to be transmitted to the stations is very complex. As a result, an access point may fail to satisfy the requirements of the stations.

Accordingly, there is demand for a device and a method for delay-aware bandwidth scheduling (DABS) in wireless communication.

BRIEF SUMMARY OF THE INVENTION

An embodiment of the present invention provides a device. The device includes: at least one antenna, a plurality of buffer sets, and a circuit. Each buffer set includes a plurality of queue buffers, and each queue buffer is dedicated for a respective application category. The circuit communicates with one or more stations through the at least one antenna. In response to the circuit determining that a plurality of incoming frames or packets are classified into the same application category, the circuit performs an intra-Access Category (intra-AC) scheduling mechanism to determine priorities of data stored in the queue buffers in the same application category according to QoS (quality-of-service) requirements of each station so as to arrange for a MU (multi-user) PPDU (physical-layer protocol data unit) to be transmitted to at least a portion of the stations.

In some embodiments, the QoS requirements of each station are obtained from the incoming frames or packets using MSCS (Mirrored Stream Classification Service) technology.

In some embodiments, the QoS requirements of each station are indicated in a DSCP (Differentiated Service Code Point) field or a ToS (Type of Service) field of the incoming frames or packets.

In some embodiments, the QoS requirements of each station are obtained from the incoming frames or packets using DPI (deep packet inspection) technology.

In some embodiments, the QoS requirements of each station are obtained from a request signal from each station to the device. The QoS requirements comprise a delay bound, minimal required throughput, jitter tolerance, and a loss rate.

In some embodiments, in response to the circuit determining that the incoming frames or packets are classified into different queue buffers in a specific buffer set for a specific station, the circuit performs an inter-AC scheduling mechanism to determine priorities of data stored in the queue buffers in the buffer set for the specific station according to the QoS requirements of the specific station so as to arrange for a SU (single-user) PPDU to be transmitted to the specific station.

In some embodiments, the circuit sends a trigger frame to the stations for scheduling the transmission of uplink data from each station, and the circuit obtains the QoS requirements from the uplink data of each station.

Another embodiment of the present invention provides a method. The method includes the following steps: communicating, via a device, with one or more stations through one or more antennas, wherein the device comprises a plurality of buffer sets, each buffer set comprises a plurality of queue buffers, and each queue buffer is dedicated for a respective application category; and in response to determination that a plurality incoming frames or packets are classified into the same application category, performing an intra-Access Category (intra-AC) scheduling mechanism to determine priorities of data stored in the queue buffers in the same application category according to the QoS (quality-of-service) requirements of each station, so as to arrange for a MU (multi-user) PPDU (physical-layer protocol data unit) to be transmitted to at least a portion of the stations.

Yet another embodiment of the present invention provides a method. The method includes the following steps: receiving, via a device, a DABS (delay-aware bandwidth scheduling) QoS (quality of service) request signal from a station, wherein the DABS QoS request signal includes one or more QoS parameters; in response to the DABS QoS request signal, performing DABS on a plurality of incoming frames or packets received from the Internet according to the one or more QoS parameters to generate one or more scheduled PPDUs (physical-layer protocol data unit); and transmitting scheduled PPDUs to the station.

BRIEF DESCRIPTION OF THE DRAWINGS

The present invention can be more fully understood by reading the subsequent detailed description and examples with references made to the accompanying drawings, wherein:

FIG. 5 is a diagram of a TSPEC element in accordance with an embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1:
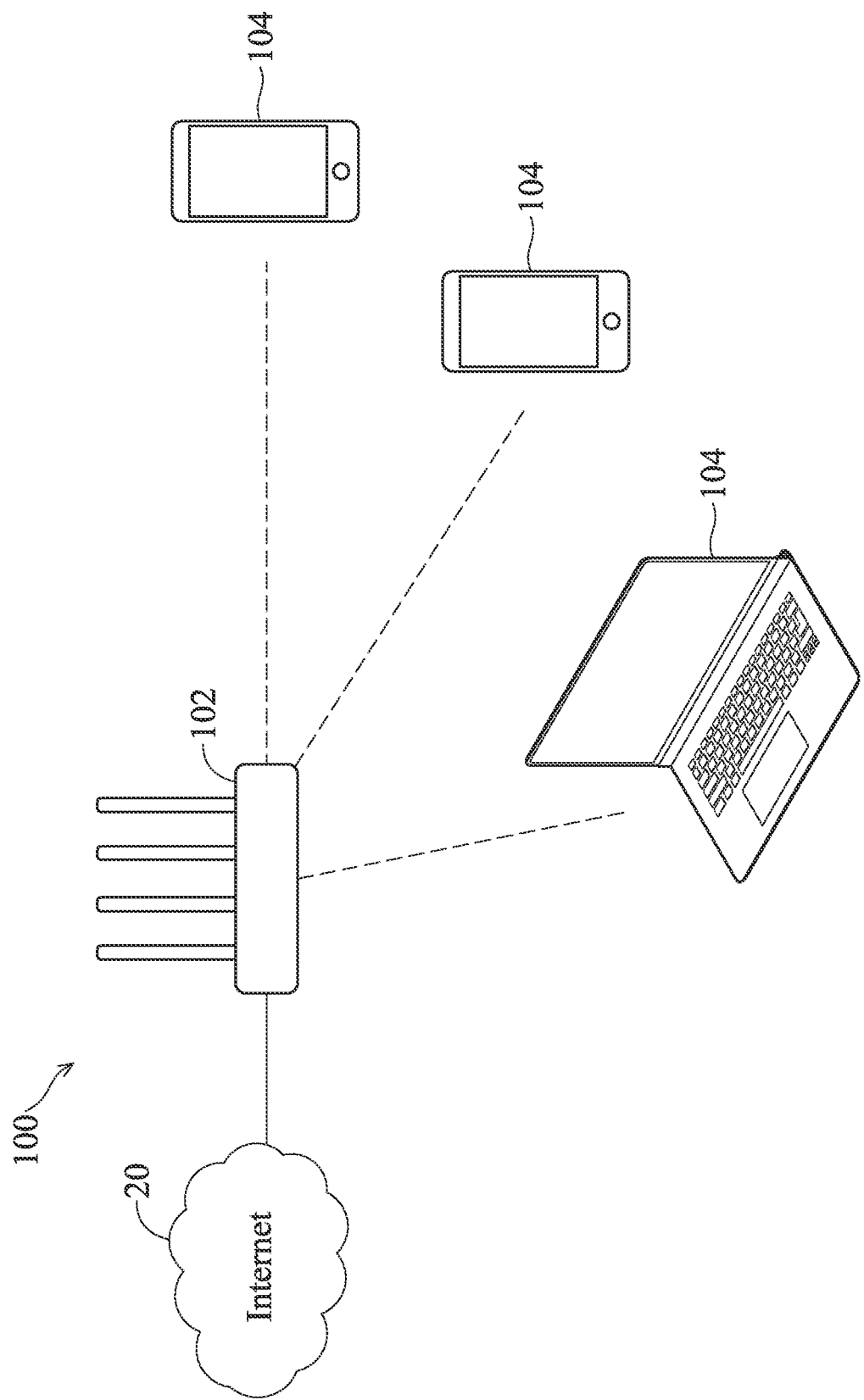
FIG. 1 is a diagram of a wireless local area network (WLAN) in accordance with an embodiment of the invention.

FIG. 1 is a diagram of a wireless local area network (WLAN) in accordance with an embodiment of the invention.

The WLAN 100 may include a wireless-communication device 102 and one or more stations (STAs) 104, wherein the stations 104 may be all or part of the stations that are located within the range of the wireless-communication device 102. In an embodiment, the wireless-communication device 102 may be a wireless access point (WAP) or a central wireless router, and the stations 104 may include laptops, desktop computers, smartphones, tablet PCs, etc. Although FIG. 1 shows one wireless-communication device 102 and three stations 104, one of ordinary skill in the art will readily recognize that there could be any number of access points and any number of stations, and such numbers would be within the spirit and scope of the invention.

In some embodiments, the wireless-communication device 102 maintains the WLAN 100 by associating and authenticating new WLAN devices such as stations 104, and by coordinating transmissions based on time and bandwidth requests by the stations 104. In one embodiment, the stations 104 enhance network efficiency by enabling data transmission by the wireless-communication device 102 to multiple stations 104 simultaneously using advanced SU beamforming and multi-user (MU) MIMO techniques.

Figure 2:
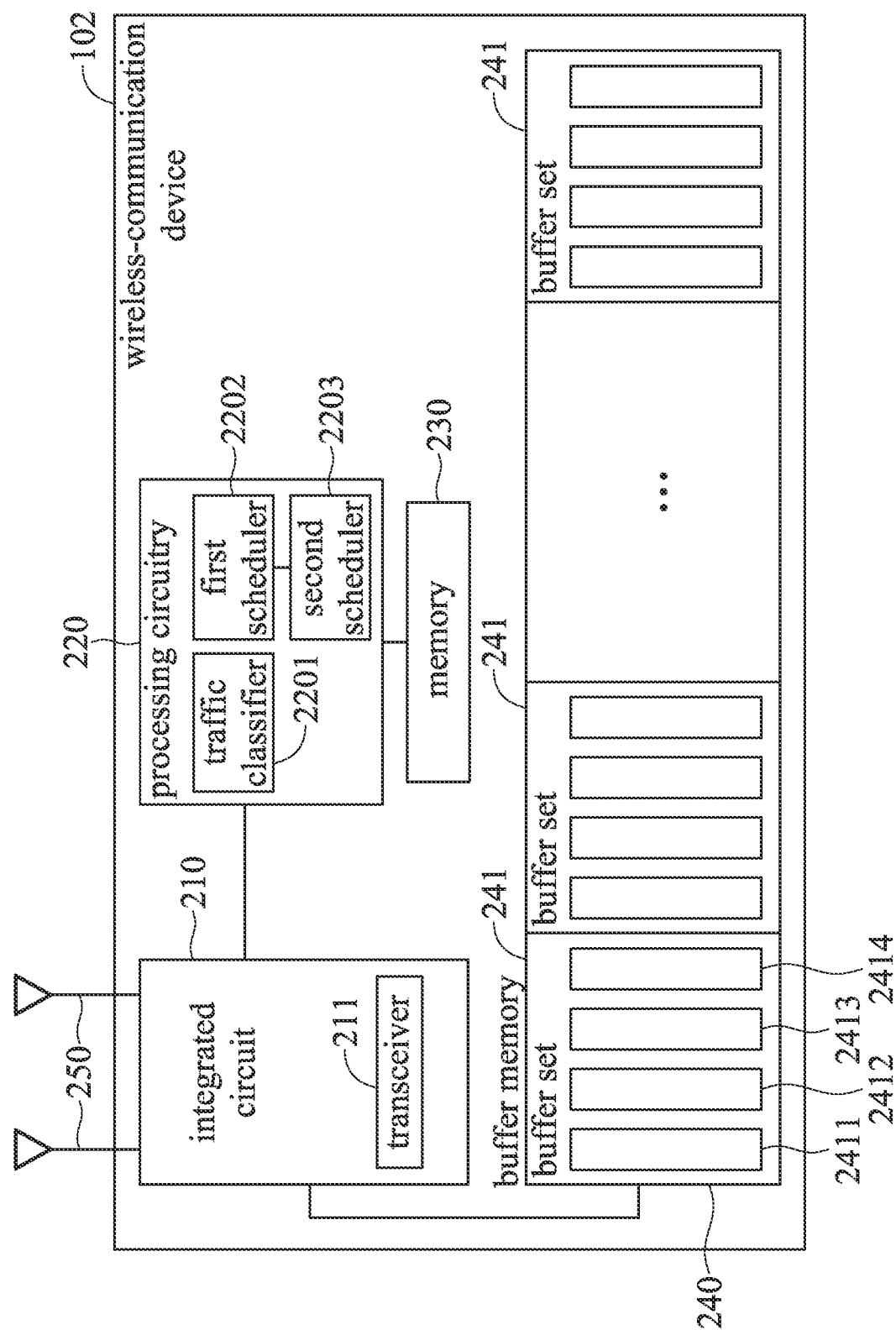
FIG. 2 is a block diagram of the wireless-communication device in accordance with the embodiment of FIG. 1.

FIG. 2 is a block diagram of the wireless-communication device in accordance with the embodiment of FIG. 1. Please refer to FIG. 1 and FIG. 2.

The wireless-communication device 102 may include an integrated circuit 210, processing circuitry 220, a memory 230, a buffer memory 240, and at least one antenna, wherein here take antennas 250 as an example.

The antennas 250 may transmit and receive radio frequency (RF) signals. The integrated circuit 210 is coupled to the antennas 250, and the integrated circuit 210 may include one or more transceivers 211 which may receive RF signal from the antennas 250, convert them to baseband signals, and send the baseband signals to the processing circuitry 220. The transceivers 211 may also convert the baseband signals from the processing circuitry 220, convert them to RF signal, and send out the RF signals to antennas 250. In some embodiments, the integrated circuit 210 may support functions of SU-MIMO (single-user multi-input multi-output) and MU-MIMO (multi-user multi-input multi-output), but the disclosure is not limited thereto. In some embodiments, the processing circuitry 220 may be implemented by a central processing unit (CPU), a general-purpose processor, a digital signal processor (DSP), or a microcontroller, but the disclosure is not limited thereto.

In some embodiments, the integrated circuit 210 may be a Wi-Fi chip, and the integrated circuit 210 and the processing circuitry 220 may be implemented by a system-on-chip (SoC), but the disclosure is not limited thereto. The memory 230 may be a volatile memory or a non-volatile memory. For example, the volatile memory may be a static random access memory (SRAM) or a dynamic random access memory (DRAM), and the non-volatile memory may be a flash memory, a read-only memory (ROM), an erasable programmable read-only memory (EPROM), or an electrically erasable programmable read-only memory (EEPROM), but the disclosure is not limited thereto. In addition, the memory 230 may store instructions or firmware that can be executed by the processor 130 to control operations of the wireless-communication device 102.

The buffer memory 240 may be a volatile memory which includes multiple buffer sets 241, and each buffer set 241 may include queue buffers 2411 to 2414. For example, each of the queue buffers 2411 to 2414 may be a FIFO (first-in first-out) buffer that stores output packets of a corresponding application to be sent to each station 104.

The quality of real time applications like Voice over Internet Protocol (VoIP) and video streaming over the Wireless Local Area Network (WLAN) are sometimes bad due to instability with the wireless link. This is the reason why there is a need to prioritize network traffic by enabling Quality of Service (QoS). Traffic Specification (TSPEC) is sent from a QoS-capable wireless client that requests a certain amount of network traffic from the wireless-communication device 102 (e.g., a WAP) for the traffic stream (TS) it represents. The wireless-communication device 102 then decides whether the request is acceptable or not and provides its decision to the client. The client can start the high-priority communication only when the WAP approves it. This prevents any kind of collision or congestion on the wireless link and thus maintains a good communication quality.

Since each station 104 may execute applications of different types, such as VoIP (Voice over Internet Protocol) applications, gaming applications, video-conferencing applications, TCP-based video-streaming applications, e-mail application, FTP (File Transfer Protocol) application, chat applications, peer-to-peer (P2P) applications, and web applications, these applications can be categorized into four types according to the requirement of delay time using "deep packet inspection (DPI)" techniques performed by the processing circuitry. For example, the processing circuitry 220 may analyze the incoming traffic (i.e., the incoming packets), and classify the incoming packets into different queues based on QoS parameters, such as a delay bound, minimal required throughput in bits per second, jitter tolerance, and a loss rate.

The IEEE 802.11e specification proposed two channel access mechanism: EDCA (Enhanced Distributed Channel Access) mechanism and HCCA (HCF Controlled Channel Access), so as to provide QoS support for time-sensitive applications. The EDCA mechanism improves the DCF (Distributed Coordination Function) by introducing four queues. For example, an incoming frame or packet is divided into four AC (Access Category), namely, AC_BK (background), AC_BE (best effort), AC_VI (video), and AC_VO (voice). These four different categories may have different priorities to access channel by using different channel-access parameters, and these priorities provide strict priority scheduling results. For example, the priorities of these four categories, from the lowest to the highest, may be AC_BK, AC_BE, AC_VI, and AC_VO.

For example, a user may be very sensitive to acoustic noises or jitters during a VoIP call, and thus the VoIP applications may have the highest requirement for the delay time (i.e., the lowest tolerable delay time). As a result, the packets for the VoIP application from the Internet (or a cloud network) have to be delivered by the wireless-communication device 102 to the station 104 in real time so as to achieve a good audio-quality level and intelligible conversation. For example, frames or packets of the VoIP applications may be classified into the AC_VO category, which has the highest priority. In addition, real-time gaming applications and video-conferencing applications may have similar high requirements for delay time (i.e., medium tolerable delay time), and these applications can be classified into the same category AC_VI in IEEE 802.11e.

More specifically, the TSPEC element contains the set of parameters, that define the characteristics and QoS expectations of a traffic flow, in the context of a particular STA, and the set of parameters can be used by the HC (Hybrid Coordinator) and STA(s) that support QoS traffic. For example, the format of a TSPEC element is shown in FIG. 5, where the lower portion of FIG. 5 includes fields 502 to 518. For example, fields 502, 504, 506, 508, 510, 512, and 514 define the service start time, minimum data rate, mean data rate, peak data rate, burst size, delay bound, and minimum PHY rate, respectively, and these fields 502 to 514 may express the QoS expectations requested by a particular STA.

For example, field 504 may define the minimum data rate in bits per second, which indicates the MPDU arrival rate. Field 512 may define the delay bound in microseconds, which indicates the queuing delay. In addition, field 518 may define the medium time, which indicates the request airtime, and it can be calculated by the PHY rate and arrival rate.

However, as the number of video/voice applications grows up, there are various QoS requirements for applications of the same category. For example, traffic of gaming applications can be classified into TCP applications (e.g., massively multiplayer online role-playing game (MMORPG)) and UDP applications (e.g., multiplayer online battle arena (MOBA)), where the MMORPG applications may have a delay bound around 50 ms to 100 ms, and the MOBA applications may have a delay bound around 30 ms to 40 ms. In addition, traffic of video applications can be classified into UDP applications (e.g., video-conferencing applications) and TCP applications (e.g., buffered-video (streaming) applications), where the video-conferencing applications may have a delay bound about 100 ms, and the buffered-video applications may have a delay bound around 200 ms to 500 ms. In addition, with the advent in technology, virtual-reality (VR) applications and cloud-gaming applications have become more and more popular. However, these VR applications and cloud-gaming applications are also very time-sensitive, but specific QoS requirements for these applications are not considered in the current IEEE 802.11 standard.

Accordingly, there are at least four QoS requirements for the gaming applications and video applications, and thus the four AC categories defined in IEEE 802.11e are not sufficient to support aforementioned respective QoS requirements. Moreover, if a particular station does not support the QoS function, the traditional WAP which supports legacy IEEE 802.11e QoS function cannot support different QoS requirements.

In an embodiment as shown in FIG. 2, the processing circuitry 220 may include a traffic classifier 2201, a first scheduler 2202, and a second scheduler 2203. The traffic classifier 2201 may be configured to analyze the incoming frames or packets from the Internet (or a cloud network) using the "deep packet inspection (DPI)" technique so as to obtain application-category information of the incoming frames or packets. The first scheduler 2202 may be regarded as a primary (priority) user set scheduler (PUSS), and may be configured to perform QoS control, such as airtime fairness and delay time in the time domain.

The second scheduler 2203 may be regarded as a time-and-frequency STA scheduler (TFSS), and may be configured to maximize user QoS requirements, such as throughput, delay, and related jitters in both the time domain and frequency domain, so as to maximize PPDU (physical-layer protocol data unit) efficiency or QoS supports. The first scheduler 2202 and the second scheduler 2203 may form a two-level-scheduler framework (e.g., a QoS scheduler) to provide airtime fairness (ATF) to each station 104 with lower complexity, and to provide delay guarantees to time-sensitive traffic in the WLAN.

In an embodiment, the integrated circuit 210 may include a physical (PHY) layer and a MAC (Medium Access Control) layer, and the processing circuitry 220 may include a firmware/driver layer, an application layer, and an OS (operating system) layer. In addition, there are several parameters in the higher layers (e.g., application layer or OS layer) and the physical (PHY) layer. For example, the parameters in the higher layers may include airtime, bandwidth, delay time, and throughput, and the parameters in the physical layer may include channel information, the queue status (e.g., statuses of queue buffers 2411 to 2414 in each buffer set 241), and PHY factors.

For example, the first scheduler 2202 may obtain the parameter of airtime from the high-layer information, and calculate the priority for each station 104 (e.g., N stations) at time t. For example, the first scheduler 2202 may use the Sigmoid function to classify the application requirements, where the Sigmoid function can be expressed using equation (1):

$$S(x) = \frac{1}{1+e^{-x}} \qquad (1)$$

where x denotes the QoS requirement. Thus, the Sigmoid function can be used to described the degree of the QoS requirement, or can be used as a classifier in machine learning.

The second scheduler 2203 may obtain the parameters of delay time and throughput from the high-layer information, and obtain parameters of channel information, queue status, and PHY factor from the physical-layer information. The second scheduler 2203 may then determine the SU (single user) or OFDMA (orthogonal frequency division multiple access) allocation for each station 104. In some embodiments, the second scheduler 2203 may calculate a delay QoS function for each application, where the delay QoS function can be expressed using equation (2):

$$y(x) = \left(\frac{1}{1 + e^{-w \cdot (x-D)}}\right) \times 100 \quad (2)$$

where D denotes the delay bound; w denotes the sensitivity of the delay performance factor.

For example, a Resource Unit is a unit in OFDMA terminology used in 802.11ax (Wi-Fi 6) WLAN to denote a group of 78.125 KHz bandwidth subcarriers (tones) used in both Downlink (DL) and UpLink (UL) transmissions. With OFDMA, different transmit powers may be applied to different RUs. There are maximum of 9 RUs for 20 MHz bandwidth, 18 in case of 40 MHz, and more in case of 80 or 160 MHz bandwidth. By using the OFDMA technique, the processing circuitry 220 may allow subcarriers (tones) in a channel bandwidth to be grouped into smaller portions called "Resource Units". These individual RU's are assigned to different stations, and the RUs enable the wireless-communication device 102 to allow stations 104 to access it simultaneously and efficiently.

In the IEEE 802.11ax (Wi-Fi 6) standard, there are a few RUs currently defined: 26-tone RU, 52-tone RU, 106-tone RU, 242-tone RU, 484-tone RU, 996-tone RU, and 2×996-tone RU. For example, for basic 20 MHz bandwidth, nine 26-tone RUs can be used, but only four with 52-tone RUs. For example, when the wireless-communication device 102 supports 52-tone RUs for its 20-MHz bandwidth, four users can transmit and/or receive simultaneously to the wireless-communication device 102. Each user uses 52-tones, but the total bandwidth for all users must be less than or equal the whole 20-MHz full allocated bandwidth.

Figure 3A:
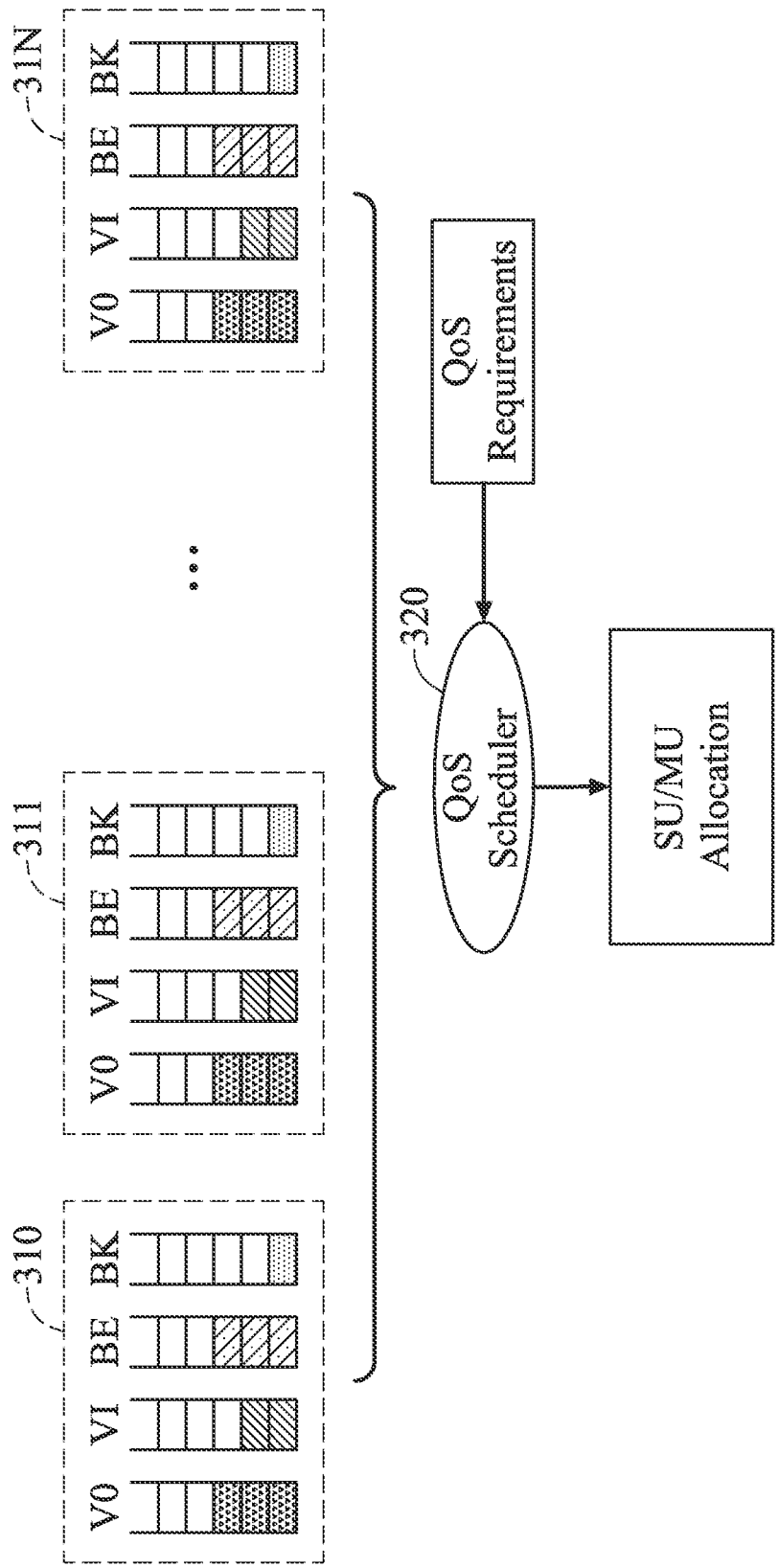
FIG. 3A is a diagram of OFDMA RU slicing in the DABS performed by the wireless-communication device in accordance with an embodiment of the invention.
Figure 3B:
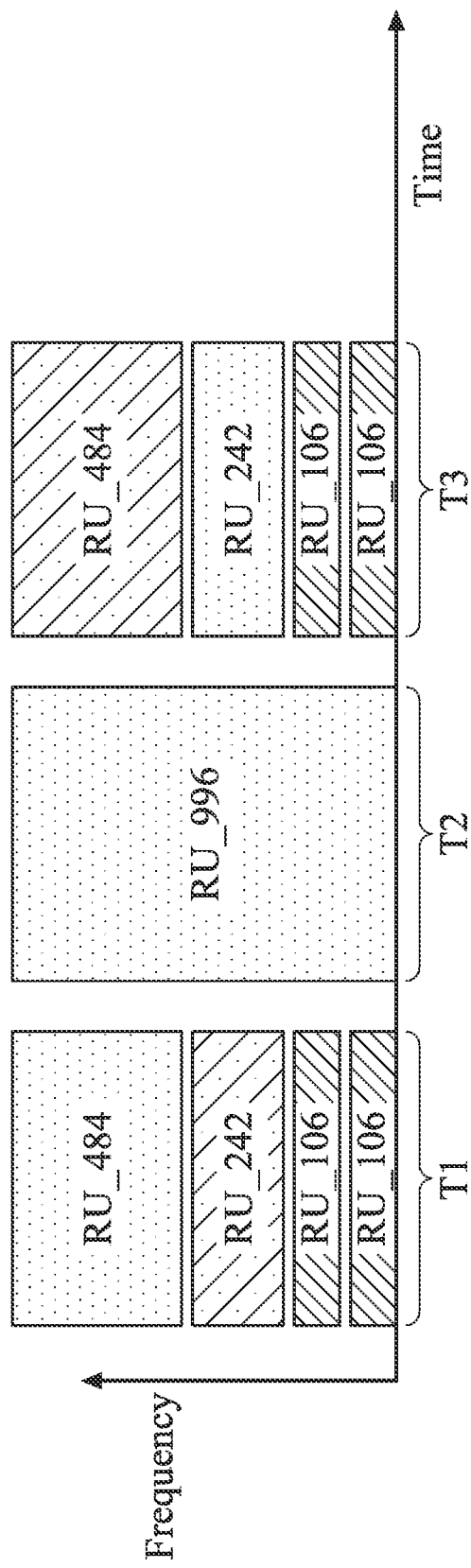
FIG. 3B is a diagram of groups of RUs over time in accordance with an embodiment of the invention.

FIG. 3A is a diagram of OFDMA RU slicing in the DABS performed by the wireless-communication device in accordance with an embodiment of the invention. FIG. 3B is a diagram of groups of RUs over time in accordance with an embodiment of the invention. Please refer to FIG. 2 and FIGS. 3A-3B.

In an embodiment, when only one of the stations 104 is active, the wireless-communication device 102 may determine the inter-queue priorities of the applications running on the active station 104. For example, given that the leftmost buffer set 241 in FIG. 2 is dedicated for the active station 104, the incoming packets or frames are classified into the queue buffers 2411 to 2414 by the processing circuitry 220, where the queue buffers 2411 to 2414 may be regarded as AC_VO, AC_VI, AC_BE, and AC_BK buffers, respectively. Given that the channel bandwidth is 80 MHz, if the RUs of the same size are used, at most eight 106-tone RUs, two 242-tone RUs, or one 484-tone RU can be used. However, a larger RU can be decomposed into smaller RUs. For example, the combination of RUs may be one 484-tone RU plus one 242-tone RU plus two 106-tone RUs, and the like.

In FIG. 3A, blocks 310 to 31N illustrates the buffer sets dedicated for station 1 to station N, and each of the blocks 310 to 31N includes four queue buffers, namely, VO, VI, BE, and BK (i.e., corresponding to AC_VO, AC_VI, AC_BE, and AC_BK). The first scheduler 2202 and second scheduler 2203 may form a QoS scheduler 320 to determine SU or OFDMA allocation of the RUs. In a scenario, the VO, VI, BE, and BK queue buffers for the stations 1 to N may store incoming packets for VoIP applications, video-conferencing applications, video streaming applications, and P2P applications. The QoS scheduler 320 may receive a plurality of QoS parameters about the higher layers and the physical layer, such as delay bound, throughput requirement, loss rate, etc. Given that the VoIP applications running on each station have the highest QoS requirement of delay time, the QoS scheduler 320 may assign the highest priority to the data stored in each VO queue buffer. In addition, the QoS scheduler 320 may also assign medium priority to the data stored in each VI queue buffer and each BE queue buffer.

As depicted in FIG. 3B, in time interval T1, the QoS scheduler 320 may group one 484-tone RU (RU_484), one 242-tone RU (RU_242), and two 106-tone RUs (RU_106) into an HE PPDU (High-Efficiency Physical-layer Protocol Data Unit), where data of the 484-tone RU, 242-tone RU, and 106-tone RUs are from the VO, BE, and VI queue buffers for each station, respectively.

In time interval T2, the QoS scheduler 320 may group one 996-tone RU (RU_996) into an HE PPDU, where the data of the 996-tone RU is from the VO queue buffer for each station. Because the data for the VoIP applications have the highest priority, the QoS scheduler may obtain the data from the VO queue buffers, and group the obtained data into the 996-tone RU in time interval T2. In time interval T3, the QoS scheduler 320 may group one 484-tone RU (RU_484), one 242-tone RU (RU_242), and two 106-tone RUs (RU_106) into an HE PPDU, where data of the 484-tone RU, 242-tone RU, and 106-tone RUs are from the BE, BK, and VI queue buffers for each station, respectively.

Figure 4:
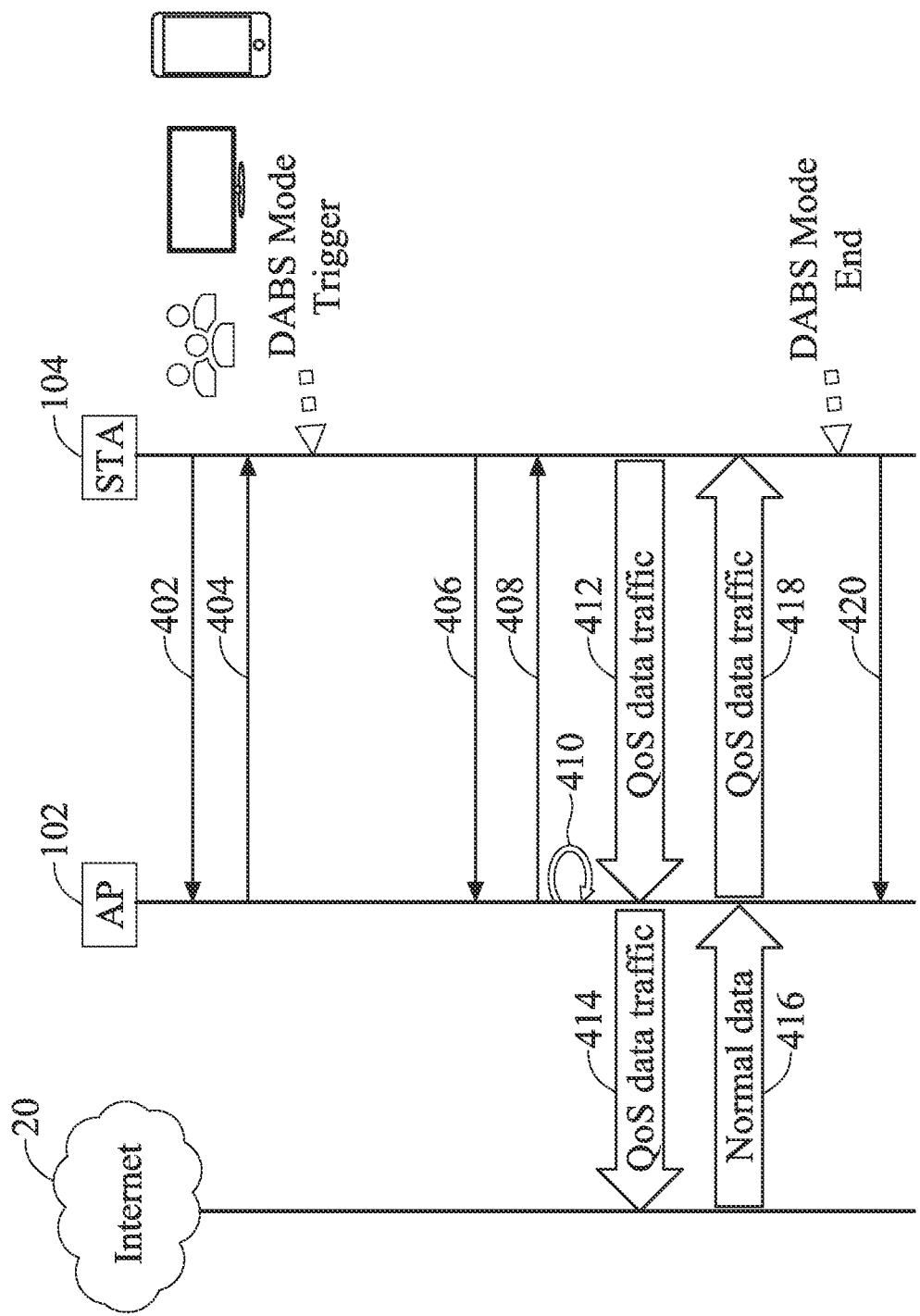
FIG. 4 is a diagram of delivering QoS parameters in the DABS mechanism in accordance with an embodiment of the invention.

FIG. 4 is a diagram of delivering QoS parameters in the DABS mechanism in accordance with an embodiment of the invention. Please refer to FIG. 2 and FIG. 4.

Given that the stations 104 are equipped with the function of DABS, when the DABS mode of a specific station 104 is triggered, the specific station 104 sends a request signal with DABS capability to the wireless-communication device 102 (step 402).

In response to the request signal from the specific station 104, the wireless-communication device 102 sends a response signal to the specific station 104. Thus, the specific station 104 may know that the wireless-communication device 102 supports the DABS function. Then, the specific station 104 sends a DABS QoS request signal to the wireless-communication device 102 (step 406). For example, the DABS QoS request signal may include one or more QoS parameters required by various applications running on the specific station 104, where the QoS parameters may include, but not limited to, delay bound, minimal throughput bits per second, and loss rate.

In response to the DABS QoS request signal from the specific station 104, the wireless-communication device 102 sends a DABS QoS response signal to the stations 104 (step 408). Thus, the specific station 104 may know that the wireless-communication device 102 may try to satisfy the QoS requirements indicated in the DABS QoS request signal. In some embodiments, the DABS QoS request signal and DABS QoS response signal may be implemented by MSCS (Mirrored Stream Classification Service) and DSCP (Differentiated Service Code Point) mapping technologies. For example, MSCS technology enables a client device to request the access point to apply specific QoS treatment of downlink IP data flows using QoS mirroring. The DSCP mapping technology aligns QoS treatment across Wi-Fi and wired networks and also enables network managers to configure specific QoS policies. In some other embodiments, the applications running on the specific station 104 may include their associated QoS parameters, and the processing circuitry 220 may obtain the QoS parameters from the applications, and group the obtained QoS parameters into the DABS QoS request signal.

In step 410, the wireless-communication device 102 may keep updating the QoS parameters. Afterwards, the station 104 sends QoS data traffic to the wireless-communication device 102 (step 412), and the wireless-communication device 102 forwards the QoS data traffic to the Internet 20 (or a cloud network) (step 414).

In response to the QoS data traffic, the Internet 20 (or a cloud network) sends normal data, that is required by the applications running on the station 104, to the wireless-communication device 102 (step 416). The normal data may include frames or packets of different applications, and the wireless-communication device 102 may classify the frames or packets into queue buffers of different categories (e.g., AC_VO, AC_VI, AC_BE, and AC_BK) according to the application-category information. For example, the classification information may be obtained from the DSCP field or the ToS (Type of Service) field of the incoming frames or packets. If the DSCP field or the ToS field is absent in the incoming frames or packets, the wireless-communication device 102 may analyze the incoming frames or packets from the Internet (or a cloud network) using the "deep packet inspection (DPI)" technique so as to obtain application-category information of the incoming frames or packets.

In addition, it should be noted that there may be more than one stations that send DABS QoS request signal to the wireless-communication device 102, and queue buffers in each buffer set for each station 104 may store corresponding frames or packets. At this time, the wireless-communication device 102 further performs DABS on the data stored in the queue buffers, and transmits the arranged PPDU (take HE PPDU as an example) to the target stations 104 (step 418).

Specifically, the QoS scheduler in the wireless-communication device 102 may include an intra-AC scheduler and inter-AC scheduler. The intra-AC scheduler may be used in the scenario that the applications of the same application category (e.g., buffered video and IPTV applications) are running on different stations 104. For example, the incoming frames or packets are stored in the same queue buffer (e.g., AC_VI) in corresponding buffer set. Thus, the intra-AC scheduler may determine the priorities of the stations so as to arrange for the PPDU (such as HE-PPDU or SU-PPDU) to be transmitted to the target stations, where the PPDU may include the data from the queue buffers of the same type.

The inter-AC scheduler may be used in the scenario that different applications are running on a specific station 104, and the incoming frames or packets are stored in different queue buffers (e.g., AC_VO, AC_VI, AC_BE, and AC_BK) in the buffer set for the specific station 104. The inter-AC scheduler may determine the priority of the data stored in each queue buffer of the buffer set for the specific station 104, and arrange the HE PPDU to be transmitted to the specific station 104, where the HE PPDU may include the data from the queue buffers of one or more types (e.g., the arrangement as shown in FIG. 3B). In response to the specific station 104 ends the DABS mode, the specific station 104 sends a DABS QoS teardown request signal to the wireless-communication device 102 (step 420).

More specifically, the intra-AC scheduler and the inter-AC scheduler may provide addition bandwidth by sacrificing the STAs the lower delay requirement (i.e., high tolerance for delay time). However, if the bandwidth provided by the wireless-communication device 102 is not sufficient, traditional scheduling mechanism will not guarantee delay requirement for the STAs with high delay requirement. For example, if the wireless-communication device 102 has an available bandwidth of 480 Mbps, and it can support about 41 STAs, each STA having bandwidth of 10 Mbps. If the number of STAs is increase from 41 to 50, these STAs may still have the same delay requirement. As a result, the delay for all STAs will be very high using the traditional scheduling mechanism, and there is no additional bandwidth to be used by the newly connected STAs.

In an embodiment, the AC queue admission control for per station is implemented in the wireless-communication device 102 to guarantee the granted RA AC QoS requirements. For example, the wireless-communication device 102 may allocate minimum bandwidth to the STAs that are newly connected to the wireless-communication device 102.

In an embodiment, the processing circuitry 220 may send a trigger frame to the stations 104 for scheduling transmission of uplink data from each station 104. For example, each station 104 may transmits its own uplink packet (e.g., UL MU PPDU) using different frequencies in a specified time according to the instructions indicated in the trigger frame. In response to receiving the UL MU PPDU from each station 104, the processing circuitry 220 may respond an ACK (Acknowledge) signal to each station 104.

FIGS. 6A-6D are diagrams of transmitting PPDUs over time in accordance with different embodiments of the invention. Please refer to FIGS. 6A-6D and FIG. 2.

In a scenario, the applications running on a specific station 104 may include a gaming application, a video-conference-call application, a VR application, a TV application, an IoT (Internet of Things) application, and other applications (e.g., including FTP, bit-torrent, web applications, etc.), and the throughput requirement and delay requirement of these applications are shown in Table 1:

TABLE 1

| Application (Abbreviation) | Throughput Req. (bps) | Delay Req. (ms) |
| --- | --- | --- |
| Gaming (G) | <1M | ≤100 ms |
| Video Con-Call (Call) | <5M | ≤30 ms |
| VR (VR) | >200M | ≤10 ms |
| TV (TV) | >20M | ≤100 ms |
| IOT (IOT) | Very low | ≤300 ms |
| Misc. Traffic (Traffic) | Variant | Variant |

Figure 6A:
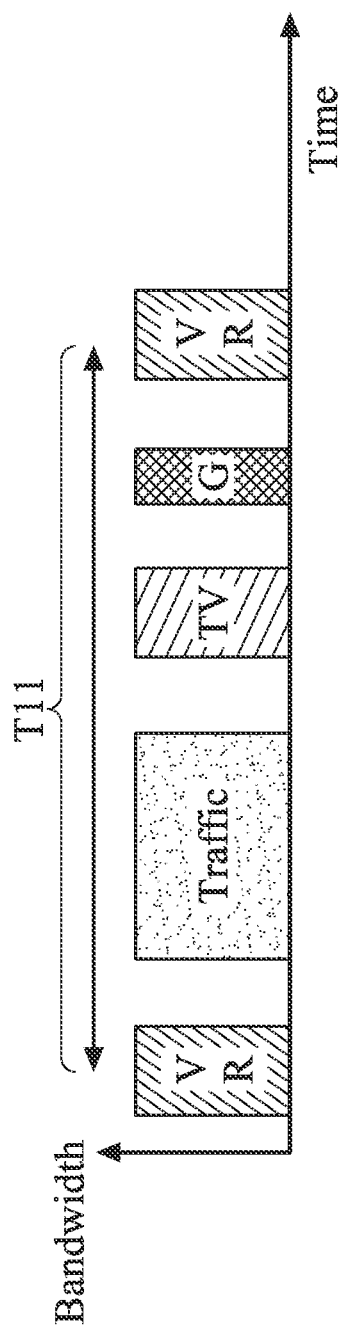
FIGS. 6A-6D are diagrams of transmitting PPDUs over time in accordance with different embodiments of the invention.

Referring to FIG. 6A, when the wireless-communication device 102 arranges the PPDUs using only the airtime fairness (ATF) round-robin method, the wireless-communication device 102 may arrange the sequence of PPDUs over time as VR, Traffic, TV, G, and VR, and so on because the VR application is the most time-sensitive application than other applications. As a result, due to the fairness of airtime for each application, the delay time (latency) of the VR application may be the time interval T11.

Figure 6B:
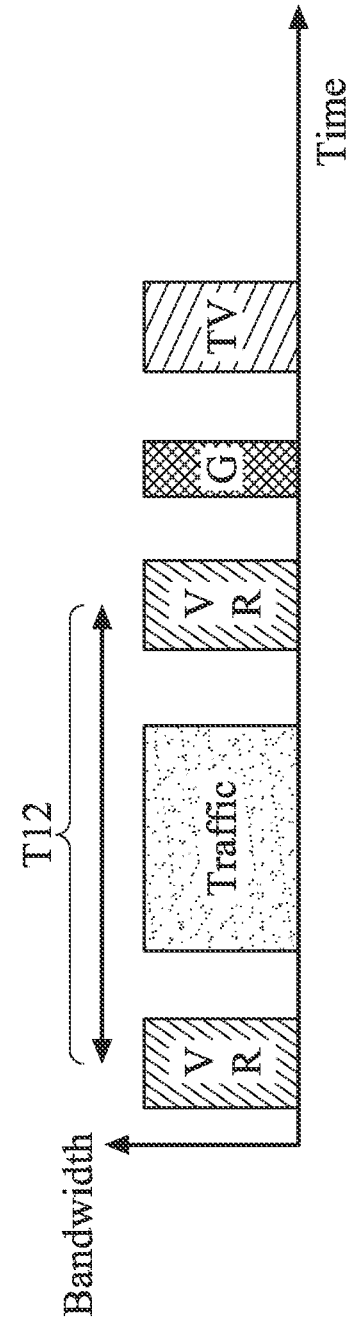

Referring to FIG. 6B, when the wireless-communication device 102 arranges the PPDUs using the airtime fairness (ATF) round-robin method plus the DABS method, the wireless-communication device 102 may arrange the sequence of PPDUs over time as VR, Traffic, VR, G, and VR, and so on because the VR application is the most time-sensitive application than other applications. As a result, the delay time (latency) of the VR application may be the time interval T12, which is shorter than the time interval T11 in FIG. 6A.

Figure 6C:
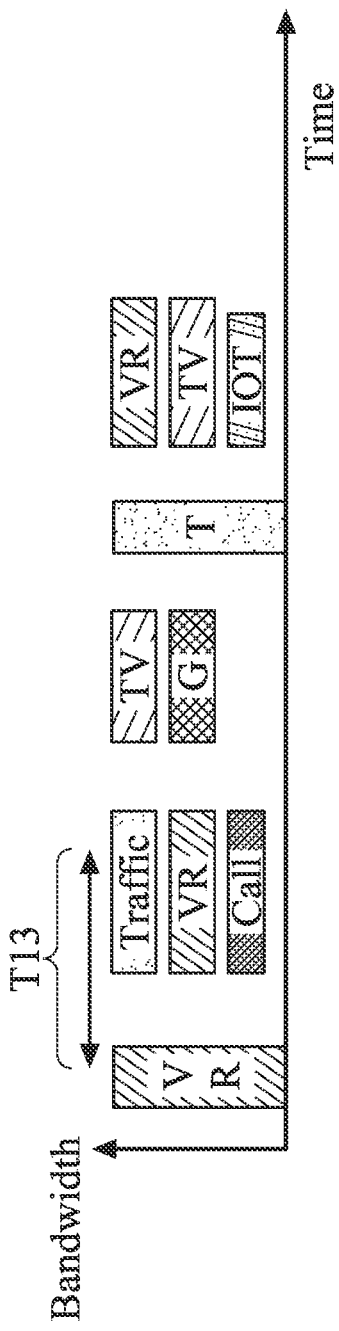
Figure 6D:
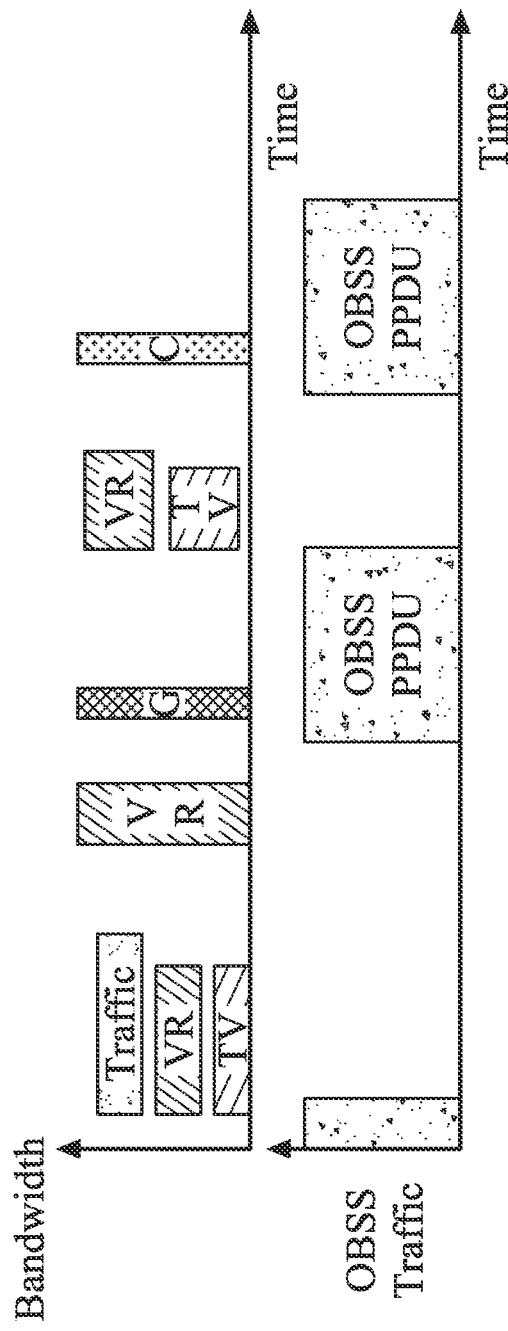

Referring to FIG. 6C, when the wireless-communication device 102 arranges the PPDUs using the airtime fairness (ATF) round-robin method plus the DABS method plus the OFDMA method, the wireless-communication device 102 may arrange the sequence of PPDUs over time as shown in FIG. 6C, where the first PPDU is dedicated for the VR application, and the second PPDU is for the Traffic applications, VR application, and video con-call application. The third PPDU is for the TV application and gaming application, and the fourth PPDU is for the Traffic applications, and the fifth PPDU is for the VR application, TV application, and IOT application. It can be understood that the RUs of the VR application are arranged into the first PPDU, second PPDU, and fifth PPDU, which may further reduce the delay time of the VR application to the time interval T13, which is much shorter than the time interval T12 in FIG. 6B. However, the Referring to FIG. 6D, when the wireless-communication device 102 arranges the PPDUs using the airtime fairness (ATF) round-robin method plus the DABS method plus the OFDMA method plus the SR (spatial reuse) technique, the wireless-communication device 102 may arrange the sequence of PPDUs over time as shown in FIG. 6D, where the first PPDU is for the Traffic applications, VR application, and TV application. The second PPDU is dedicated for the VR application, and the third PPDU is for the gaming application, and the fourth PPDU is for the VR application and TV application, and the fifth PPDU is dedicated for the video con-call application. It should be noted that the wireless-communication device 102 may give additional chances to the RUs of the gaming application and video con-call application to be arranged into the OBSS (Overlapping Basic Service Set) PPDU during the OBSS period so as to reduce the delay time (latency) of the gaming application and video con-call application which are also time-sensitive, thereby improving the user experience.

Figure 7A:
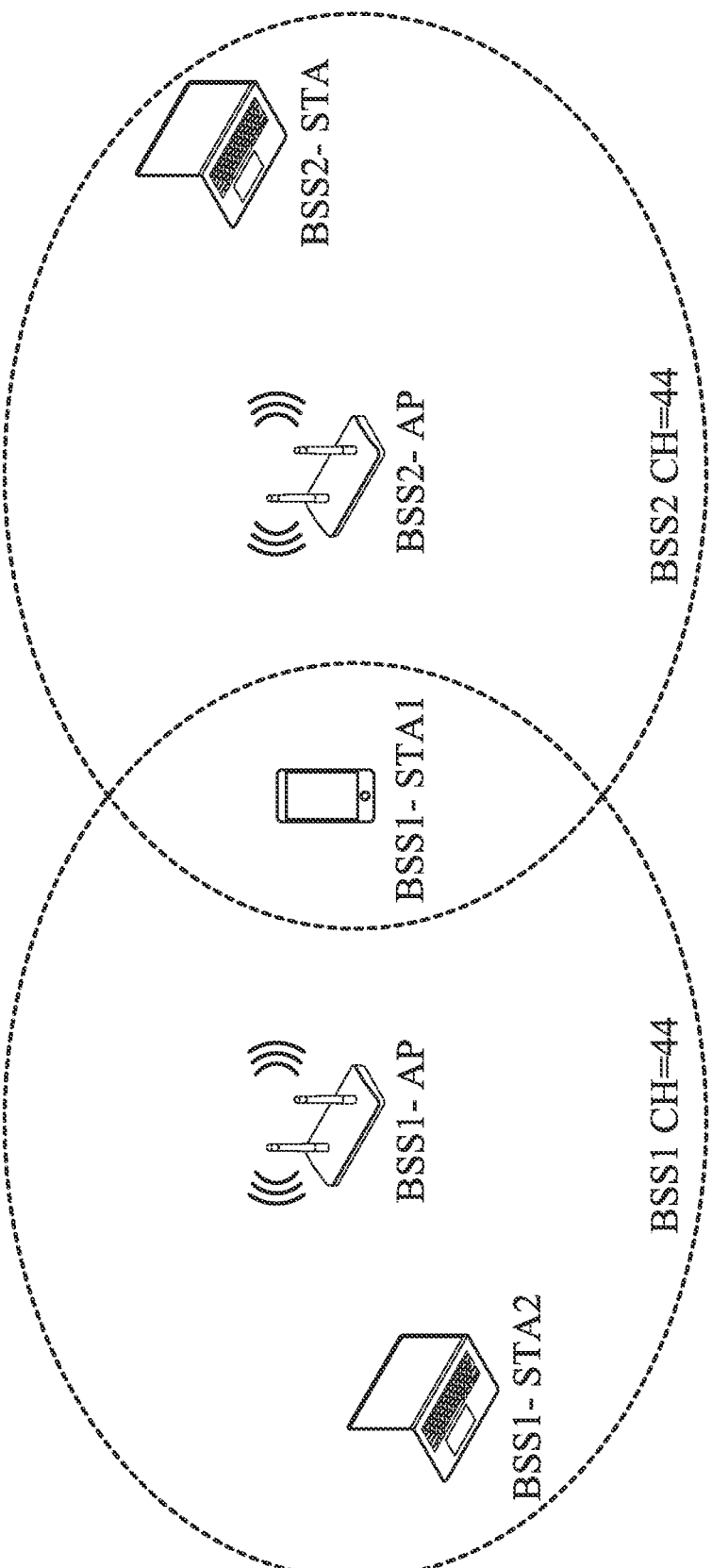
FIG. 7A shows a diagram of a WLAN having overlapping basic service sets in accordance with an embodiment of the invention.

For example, FIG. 7A shows a diagram of an overlapping basic service set in accordance with an embodiment of the invention. Given that there are two basic service sets BSS1 and BSS2, the basic service sets BSS1 and BSS2 use the same Wi-Fi channel (e.g., CH=44). The basic service set BSS1 may include an access point BSS1-AP, and stations BSS1-STA1 and BSS1-STA2, where the access point BSS1-AP may be implemented by the wireless-communication device 102. The basic service set BSS2 may include an access point BSS2-AP and a station BSS2-STA. Each of the basic service sets BSS1 and BSS2 belongs to the OBSS from the view of each other. The station BSS1-STA may suffer from the BSS2's interference during both the access points BSS1-AP and BSS2-AP transmitting PPDUs (i.e., Tx) to their respective station BSS1-STA and BSS2-STA with an overlapped period of time.

Figures 7B, 7C:
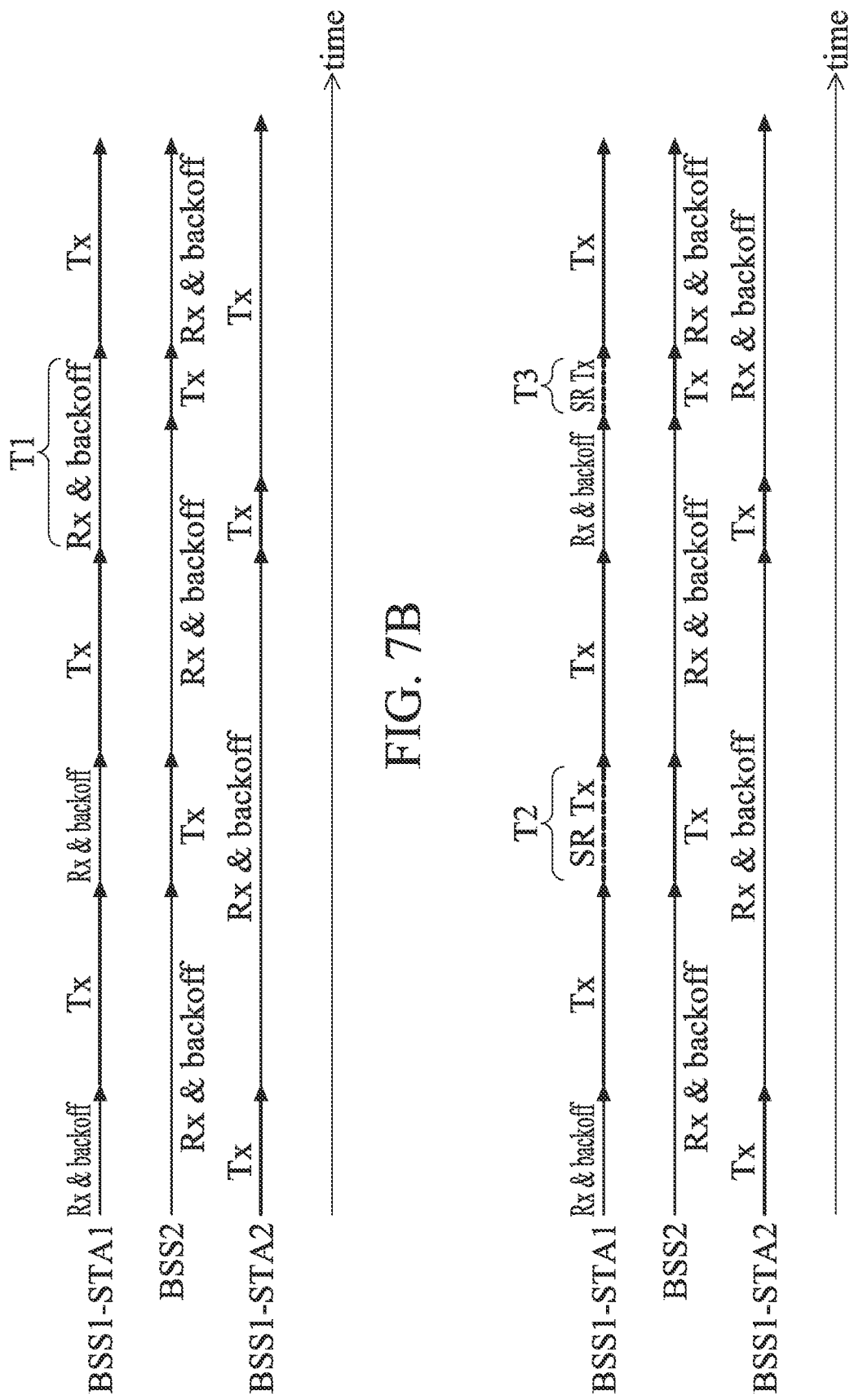
FIG. 7B shows a timing diagram of the Tx and Rx operations of the access points in the WLAN without the spatial reuse technique in accordance with the embodiment of FIG. 7A.
FIG. 7C shows a timing diagram of the Tx and Rx operations of the access points in the WLAN using the spatial reuse technique in accordance with the embodiment of FIG. 7A.

If the spatial reuse (SR) technique is not used, the access point BSS1-AP cannot transmit PPDUs to the stations BSS1-STA1 and BSS1-STA2 in the basic service set BSS1 while the access point BSS2-AP in the basic service set BSS2, which is an OBSS to the basic service set BSS1, is transmitting PPDUs to the station BSS2-STA1 at time interval T1, as shown in FIG. 7B. In addition, if the spatial reuse technique is used, the access point BSS1-AP can transmit PPDUs to the stations BSS1-STA1 and BSS1-STA2 in the basic service set BSS1 while the access point BSS2-AP in the basic service set BSS2 is transmitting PPDUs to the station BSS2-STA1 at time intervals T2 and T3, as shown in FIG. 7C. In other words, the airtime can be reused by the access point BSS1-AP using the spatial reuse technique.

Figure 7D:
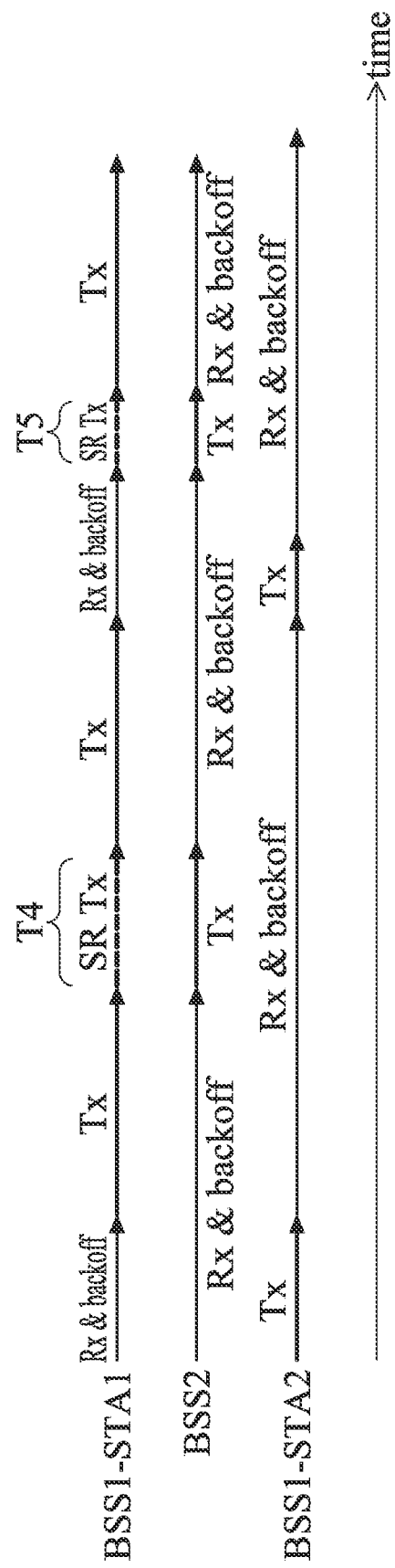
FIG. 7D shows a timing diagram of the Tx and Rx operations of the access points in the WLAN using the DABS mechanism plus the spatial reuse technique in accordance with the embodiment of FIG. 7A.

Please refer to both FIG. 6D and FIG. 7D. If the DABS technique plus the spatial reuse technique are used, the access point BSS1-AP in the basic service set BSS1 can transmit PPDUs to the station BSS1-STA1 by the DABS scheduler (e.g., the QoS scheduler 32n0 in FIG. 3A) at time interval T4 while the station BSS2-AP in the basic service set BSS2 is transmitting PPDUs to the station BB 2-STA. In addition, the access point BSS1-AP in the basic service set BSS1 can transmit PPDUs to the station BSS1-STA2 by the DABS scheduler at time interval T5 while the station BSS2-AP in the basic service set BSS2 is transmitting PPDUs to the station BBS2-STA.

Specifically, the access point BSS1-AP can determine whether to transmit the PPDU of the applications having high delay requirement (i.e., a lower delay is required) during the SR reuse period of the OBSS. When the stations BSS1-STA1 and BSS1-STA2 are respectively running a gaming application and a video con-call application, the DABS scheduler of the access point BSS1-AP determines to transmit the PPDU to the station BSS1-STA1 at time interval T4, and determines to transmit the PPDU to the station BSS1-STA2 at time interval T5. Accordingly, the gaming application and the video con-call application running on the stations BSS1-STA1 and BSS1-STA2 can obtain additional chances to receive the required PPDU during the OBSS period (i.e., time intervals T4 and T5) so as to reduce the delay time (latency), thereby improving the user experience.

Figure 7E:
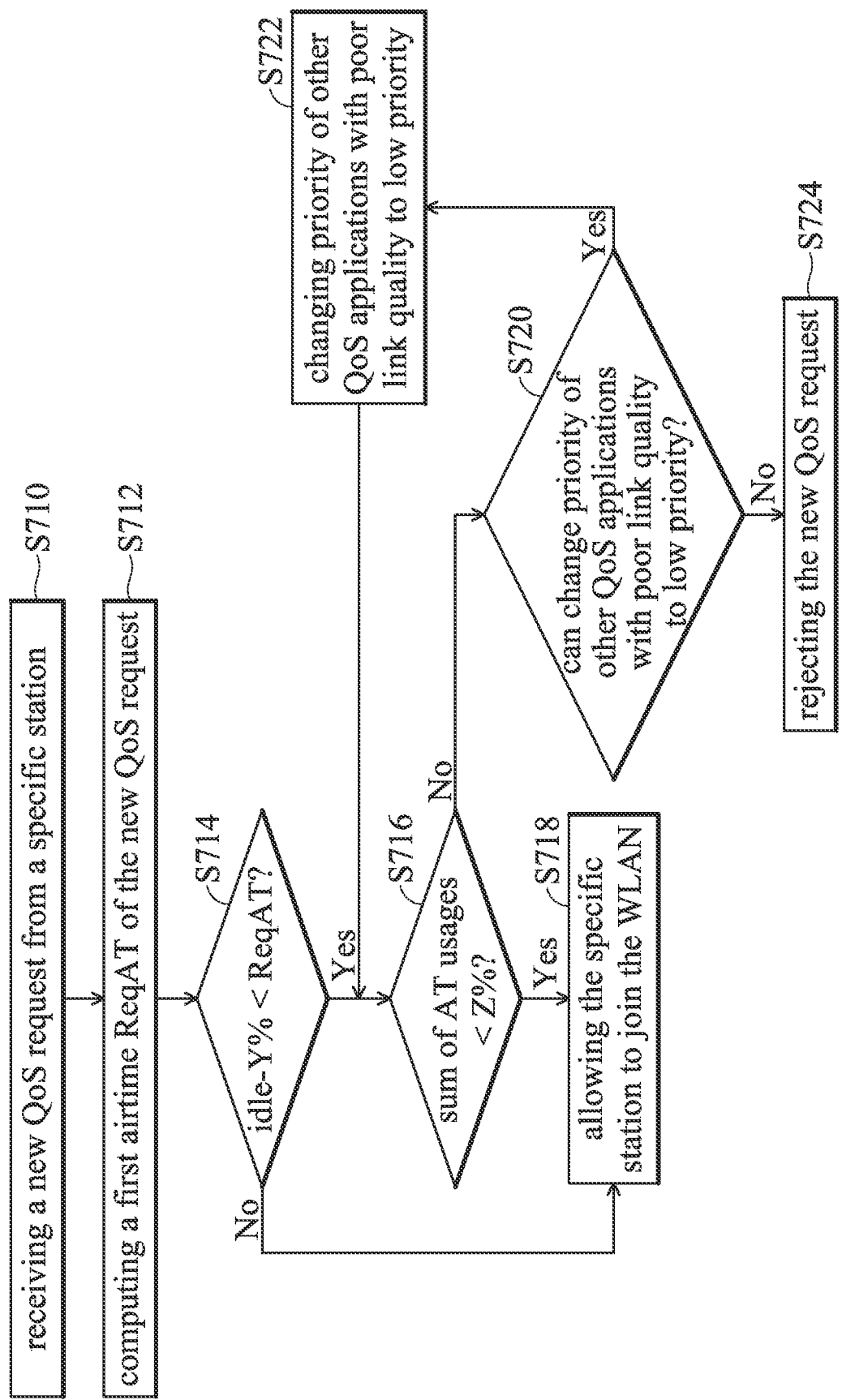
FIG. 7E is a flow chart of a method for handling a new QoS request by DABS admission control in accordance with an embodiment of the invention.

FIG. 7E is a flow chart of a method for handling a new QoS request by DABS admission control in accordance with an embodiment of the invention. Please refer to FIG. 1 and FIG. 2.

In step S710, the wireless-communication device 102 receives a new QoS request from a specific station. For example, the specific station, which supports the QoS function, may be within the range of the wireless-communication device 102, and is trying to connect to the wireless-communication device 102.

In step S712, the wireless-communication device 102 computes a first airtime ReqAT (request airtime) of the new QoS request, wherein a first airtime of QoS can be the time between 0 to 1 second in one example. For example, the wireless-communication device 102 may calculate the first airtime ReqAT using equation (3):

$$ReqAT = \frac{DataRate}{PHYRate * X\ \%} \quad (3)$$

where DataRate denotes the currently data rate of the wireless-communication device 102; PHYRate denotes the data rate of the physical layer of the wireless-communication device 102; and X denotes a predetermined constant. In some embodiments, the value of X may be 80, but the invention is not limited thereto.

In step S714, the wireless-communication device 102 determines whether the idle airtime usage minus a first preset percentage (e.g., Y %, such as 10%) is less than the first airtime ReqAT. If the idle airtime usage minus the first preset percentage is less than the first airtime ReqAT, step S716 is performed. If the idle airtime usage minus the first preset percentage is greater than or equal to the first airtime ReqAT, it indicates that there is sufficient airtime for the new QoS request, and the wireless-communication device 102 may allow the specific station to join the WLAN 100 (step S718).

In step S716, the wireless-communication device 102 determines whether a sum of multiple airtime (AT) usages is less than a second preset percentage (e.g., Z %, such as 90% which indicates 10% idle airtime usage). If the sum of multiple airtime usages is less than a second preset percentage, it indicates that there is sufficient airtime for the new QoS request, and the wireless-communication device 102 may allow the specific station to join the WLAN 100 (step S718). If the sum of multiple airtime usages is greater than or equal to a second preset percentage, step S720 is performed. Specifically the aforementioned multiple airtime usages may include the first airtime ReqAT, the airtime OBSS_AT used by other access point, the airtime QoS_AT used by high-priority applications, and the airtime BKAT used by low-priority applications. Thus, the wireless-communication device 102 may calculate the total airtime usage of the new QoS request plus the airtime OBSS_AT plus the airtime QoS_AT plus the airtime BKAT. If the total airtime usage is less than the second preset percentage, it indicates that there is sufficient airtime for the new QoS request, and the wireless-communication device 102 may allow the specific station to join the WLAN 100.

In step S720, the wireless-communication device 102 may determine whether the priority of other QoS applications with poor link quality can be changed to low priority. If it is determined that other QoS applications with poor link quality can be changed to low priority, step S722 is performed to change the priority of other QoS applications with poor link quality to low priority. If it is determined that other QoS applications with poor link quality cannot be changed to low priority, it may indicate that all the other QoS applications may have high priority and good link quality, and the wireless-communication device 102 cannot change any one of the QoS applications to low priority. In this case, the wireless-communication device 102 may reject the new QoS request (step S724).

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any device that can contain, store, communicate, propagate, or transport the program for use by or in connection with the instruction execution system, device, or device.

The medium may be an electronic, magnetic, optical, electromagnetic, infrared, semiconductor system (or device or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device, comprising:
at least one antenna; and
a plurality of buffer sets, wherein each buffer set comprises a plurality of queue buffers, and each queue buffer is dedicated for a respective application category;
a circuit, communicating with one or more stations through the at least one antenna, wherein the circuit is configured to classify a plurality of incoming frames or packets according to delay time requirements of applications corresponding to the plurality of incoming frames or packets, wherein the delay time requirements respectively indicate that delay time of the plurality of incoming frames or packets have to be lower than certain values;
wherein in response to the circuit determining that the plurality of incoming frames or packets are classified into the same application category, the circuit performs an intra-Access Category (intra-AC) scheduling mechanism to determine priorities of data stored in the queue buffers for the same application category according to the delay time requirements of applications and QoS (quality-of-service) requirements of each station so as to arrange for a PPDU (physical-layer protocol data unit) to be transmitted to at least a portion of the stations.

2. The device as claimed in claim 1, wherein the QoS requirements of each station are obtained from the incoming frames or packets using MSCS (Mirrored Stream Classification Service) technology.

3. The device as claimed in claim 2, wherein the QoS requirements of each station are indicated in a DSCP (Differentiated Service Code Point) field or a ToS (Type of Service) field of the incoming frames or packets.

4. The device as claimed in claim 1, wherein the QoS requirements of each station are obtained from the incoming frames or packets using DPI (deep packet inspection) technology.

5. The device as claimed in claim 1, wherein the QoS requirements of each station are obtained from a request signal from each station to the device.

6. The device as claimed in claim 1, wherein the QoS requirements comprise a delay bound, minimal required throughput, jitter tolerance, and a loss rate.

7. The device as claimed in claim 6, wherein the delay bound has tolerance within a predetermined percentage.

8. The device as claimed in claim 1, wherein in response to the circuit determining that the incoming frames or packets are classified into different queue buffers in a specific buffer set for a specific station, the circuit performs an inter-AC scheduling mechanism to determine priorities of data stored in the queue buffers in the buffer set for the specific station according to the QoS requirements of applications running on the specific station so as to arrange for a PPDU to be transmitted.

9. The device as claimed in claim 1, wherein the circuit sends a trigger frame to the stations for scheduling transmission of uplink data from each station, and the circuit obtains the QoS requirements from the uplink data of each station.

10. A method, comprising:
communicating, via a device, with one or more stations through at least one antenna, wherein the device comprises a plurality of buffer sets, each buffer set comprises a plurality of queue buffers, and each queue buffer is dedicated for a respective application category, wherein a plurality of incoming frames or packets are classified according to delay time requirements of applications corresponding to the plurality of incoming frames or packets, wherein the delay time requirements respectively indicate that delay time of the plurality of incoming frames or packets have to be lower than certain values; and
performing an intra-Access Category (intra-AC) scheduling mechanism to determine priorities of data stored in the queue buffers for the same application category according to the delay time requirements of applications and QoS (quality-of-service) requirements of each station so as to arrange for an PPDU (physical-layer protocol data unit) to be transmitted to at least a portion of the stations, in response to a determination that the plurality of incoming frames or packets are classified into the same application category.

11. The method as claimed in claim 10, wherein the QoS requirements of each station are obtained from the incoming frames or packets using MSCS (Mirrored Stream Classification Service) technology.

12. The method as claimed in claim 11, wherein the QoS requirements of each station are indicated in a DSCP (Differentiated Service Code Point) field or a ToS (Type of Service) field of the incoming frames or packets.

13. The method as claimed in claim 10, wherein the QoS requirements of each station are obtained from the incoming frames or packets using DPI (deep packet inspection) technology.

14. The method as claimed in claim 10, wherein the QoS requirements of each station are obtained from a request signal from each station to the device.

15. The method as claimed in claim 10, wherein the QoS requirements comprise a delay bound, minimal required throughput, jitter tolerance, and a loss rate.

16. The method as claimed in claim 15, wherein the delay bound has tolerance within a predetermined percentage.

17. The method as claimed in claim 13, further comprising:
in response to a determination that the incoming frames or packets are classified into different queue buffers in a specific buffer set for a specific station, performing an inter-AC scheduling mechanism to determine priorities of data stored in the queue buffers in the buffer set for the specific station according to the QoS requirements of applications running on the specific station so as to arrange for a PPDU to be transmitted.

18. The method as claimed in claim 13, further comprising:
sending a trigger frame to the stations for scheduling transmission of uplink data from each station; and
obtaining the QoS requirements from the uplink data of each station.

19. A method, comprising:
receiving, via a device, a DABS (delay-aware bandwidth scheduling) QoS (quality of service) request signal from a station, wherein the DABS QoS request signal includes one or more QoS parameters, wherein the device comprises a plurality of buffer sets, each buffer set comprises a plurality of queue buffers, and each queue buffer is dedicated for a respective application category;
in response to the DABS QOS request signal, performing DABS on a plurality of incoming frames or packets received from the Internet according to the one or more QoS parameters to generate one or more scheduled PPDUs (physical-layer protocol data unit); and
transmitting the scheduled PPDUs;
wherein performing DABS comprises classifying the plurality of incoming frames or packets according to delay time requirements of applications corresponding to the plurality of incoming frames or packets;
wherein the delay time requirements respectively indicate that delay time of the plurality of incoming frames or packets have to be lower than certain values;
wherein performing DABS on a plurality of incoming frames or packets received from the Internet according to the one or more QoS parameters further comprises performing an intra-Access Category (intra-AC) scheduling mechanism to determine priorities of data stored in the queue buffers for the same application category according to the delay time requirements of applications and QoS (quality-of-service) requirements of the station so as to arrange for the scheduled PPDUs.

20. The method as claimed in claim 19, wherein the QoS requirements comprise a delay bound, minimal required throughput, jitter tolerance, and a loss rate.

* * * * *